(12) United States Patent
Suman

(10) Patent No.: US 12,372,338 B2
(45) Date of Patent: Jul. 29, 2025

(54) METHOD OF REDUCING GUN BARREL HEATING

(71) Applicant: Andrew W. Suman, Waterford, MI (US)

(72) Inventor: Andrew W. Suman, Waterford, MI (US)

(*) Notice: Subject to any disclaimer, the term of this patent is extended or adjusted under 35 U.S.C. 154(b) by 108 days.

(21) Appl. No.: 18/159,853

(22) Filed: Jan. 26, 2023

(65) Prior Publication Data

US 2023/0168071 A1 Jun. 1, 2023

Related U.S. Application Data

(63) Continuation of application No. PCT/US2021/028705, filed on Apr. 22, 2021.

(60) Provisional application No. 63/058,447, filed on Jul. 29, 2020.

(51) Int. Cl.
| | |
|---|---|
| *F42B 12/82* | (2006.01) |
| *C09D 5/03* | (2006.01) |
| *C09D 7/61* | (2018.01) |
| *F42B 12/78* | (2006.01) |
| *F42B 14/02* | (2006.01) |

(52) U.S. Cl.
CPC ............ *F42B 12/82* (2013.01); *C09D 5/037* (2013.01); *C09D 7/61* (2018.01); *F42B 12/78* (2013.01); *F42B 14/02* (2013.01)

(58) Field of Classification Search
CPC ......... F42B 12/76; F42B 12/78; F42B 12/80; F42B 12/82; F42B 14/00; F42B 14/02; F41A 29/04; F41A 29/18; C09D 5/03; C09D 5/037; C09D 7/61; C09D 7/65
USPC ................................ 102/511, 514, 515, 516
See application file for complete search history.

(56) References Cited

U.S. PATENT DOCUMENTS

| | | | | |
|---|---|---|---|---|
| 2,703,768 A | * | 3/1955 | Hall ...................... | F16N 15/02 428/472 |
| 4,196,670 A | * | 4/1980 | Vatsvog ................ | F42B 12/80 427/419.7 |
| 4,328,750 A | | 5/1982 | Oberg et al. | |

(Continued)

FOREIGN PATENT DOCUMENTS

CN 108558410 A 9/2018

OTHER PUBLICATIONS

International Search Report & Written Opinion of the International Searching Authority dated Sep. 27, 2021 for International Application No. PCT/US2021/028705.

*Primary Examiner* — James S Bergin
(74) *Attorney, Agent, or Firm* — Eschweiler & Potashnik, LLC

(57) ABSTRACT

A cartridge includes a bullet on which there is formed a coating. At least an upper layer of the coating is porous and comprises a thermoset polymer and a filler. The filler may be a dry film lubricant. The cartridge may be used in a gun of the type that has a rifled barrel. A rifled barrel has a bore diameter and a groove diameter. The bullet may have a metal diameter that is less than the groove diameter but slightly greater than the bore diameter. The coated bullet may have a diameter that is greater than or equal to the groove diameter. When fired, the bullet produces less barrel friction and heating than a conventional bullet. The velocity of the coated bullets is greater and the velocity distribution is more narrow compared to uncoated bullets.

20 Claims, 5 Drawing Sheets

(56) References Cited

U.S. PATENT DOCUMENTS

| | | | | |
|---|---|---|---|---|
| 4,876,050 | A | * | 10/1989 | Horton ................ B29C 35/0222 |
| | | | | 264/102 |
| 9,254,503 | B2 | * | 2/2016 | Ward ....................... F42B 12/80 |
| 2003/0101891 | A1 | * | 6/2003 | Amick .................... F42B 12/34 |
| | | | | 102/514 |
| 2004/0111975 | A1 | | 6/2004 | Suman |
| 2007/0095241 | A1 | | 5/2007 | Rice et al. |
| 2011/0236712 | A1 | | 9/2011 | Masago et al. |
| 2012/0199033 | A1 | | 8/2012 | Bybee et al. |
| 2014/0261046 | A1 | * | 9/2014 | Marx ................... F42B 12/367 |
| | | | | 102/517 |
| 2017/0089673 | A1 | | 3/2017 | Burrow |
| 2020/0225012 | A1 | * | 7/2020 | De Bonis .............. F42B 12/367 |
| 2023/0160653 | A1 | * | 5/2023 | Suman ................. C10M 171/00 |
| | | | | 89/1.25 |

* cited by examiner

METHOD OF REDUCING GUN BARREL HEATING

REFERENCE TO RELATED APPLICATIONS

This Application is a 371 continuation of PCT/US2021/028705, filed on Apr. 22, 2021, which claims the benefit of U.S. Provisional Application No. 63/058,447, filed on Jul. 29, 2020. The contents of the above-referenced patent applications are hereby incorporated by reference in their entirety.

BACKGROUND

A rifle barrel has helical grooves and lands. The narrower diameter, the land-to-land diameter, which is the maximum diameter of a cylindrical plug that can fit through the barrel, is referred to as the bore diameter. The greater diameter, the groove-to-groove diameter, is referred to as the groove diameter. Bullets normally have a diameter that is approximately the groove diameter to limit the amount of propulsive gas that slips past the bullet as it travels down the barrel. To fit through the barrel, the bullet distorts sufficiently to move past the lands. As the bullet accelerates down the barrel, the bullet presses against the helical lands forcing the bullet to spin. The spin stabilizes the bullet's flight. Friction between the bullet and the barrel produces heat. The heat can become excessive if the gun is fired rapidly.

SUMMARY

One aspect of the present teachings is a cartridge having a coating formed on a metal bullet. At least an upper layer of the coating is porous and comprises a thermoset polymer and a filler. In some embodiments, the bullet is for use in a gun of the type that has a rifled barrel. The rifled barrel has a bore diameter and a groove diameter. In some embodiments, the bullet has a metal diameter (diameter of the metal bullet without the coating) that is less than the groove diameter. In some embodiments, the bullet has a coating diameter (diameter of the metal bullet with the coating) that is greater than or equal to the groove diameter.

In some of these embodiments, the metal diameter is greater the bore diameter and less than the groove diameter. In some of these embodiments, the metal diameter is no greater than the bore diameter plus half the difference between the groove diameter and the bore diameter. In some of these embodiments, the metal diameter is no greater than the bore diameter plus one fourth the difference between the groove diameter and the bore diameter. In some embodiments, the metal diameter is at least the bore diameter plus one tenth the difference between the groove diameter and the bore diameter.

When the bullet is fired, the bullet shape is distorted sufficiently for the bullet to fit through the barrel. The metal portion of the bullet is distorted sufficiently to form ridges that ride on the lands, but there in not sufficient metal material to plug the grooves. The coating may be completely abraded off the bullet where the bullet contacts the peaks of the lands, but remains at least partially on the bullet between the lands. Sufficient coating may remain on the bullet to plug the grooves. In some embodiments, the grooves may be plugged primarily by the coating. In some embodiments, the contact area between the coating and the barrel is greater than the contact area of the bullet metal and the barrel.

Operating the gun with cartridges according to the present teaching results in much less barrel heating than if the gun were operated using conventional cartridges. The coating has a lower coefficient of friction than the bullet metal. In some embodiments, the filler comprises a dry film lubricant. Accordingly, residue left by the bullet in the barrel further contributes to reducing friction, particularly in comparison to a similar residue that would be left by lead or the like. An additional benefit of using cartridges according to the present teachings is more consistent bullet velocity. When using cartridges according to the present teachings, the velocity is less sensitive to small variations in bullet diameter as compared to using cartridges with uncoated bullets. This may be due to the lower friction or to the greater ease with which the coated bullet may be distorted to fit the barrel.

In some embodiments, the filler is present in an amount from 15 to 40 percent by volume of solid material in the upper layer. In some embodiment, the upper layer is formed from a powder of particles that individually have the filler in an amount from 15% to 40% by volume. If there is too little filler, the coating may not have desired wear properties, such as friability. If there is too much filler, the coating may be difficult to process. In some embodiments, the filler is a dry film lubricant.

In some embodiments, the upper layer comprises particles adhered to one another with spaces in between. In some embodiments, that structure is formed by curing particles containing a thermosetting resin and the filler in such a way that the particles sinter but do not flow sufficiently to lose their discrete identities. One consequence of this limited flow is that the resulting coating has roughness that is related to a structure of the particles. In some embodiments, a powder of the particles is applied to the part surface by electrostatic deposition. In some embodiments, the powder is formed from a process that includes melt-mixing the thermosetting resin and the filler material to form a composite, cooling the composite, and breaking up the cooled composite to form the powder. In some embodiments, the filler is graphite although many other fillers may be used.

In some embodiments, the coating further comprises a non-porous lower layer comprising a second thermoset polymer. In some embodiments, the lower layer is derived from a liquid comprising a second thermosetting resin. The liquid is applied to the surface prior to coating with the powder. In some embodiments, the powder is applied over the liquid prior to drying or curing the liquid. The powder and the liquid are cured together to form the coating. The liquid may form a nonporous layer proximate the surface while the powder forms the porous upper layer. The lower layer improves adhesion of the coating.

In some embodiments, the porous upper layer contains lubricant. In some embodiments, the upper layer has a porosity in the range from 2% to 80%. In some embodiments, the upper layer has an interconnectivity above a percolation threshold. In some embodiments, the coating undergoes compression and expresses lubricant during firing of the gun. The compression may bring lubricant to the surface of the coating. The coating is resilient under this type of compression.

The coating may be applied as thickly as desired. In some embodiments, the coating has a thickness of 25 µm or more over at least a portion of the bullet surface. In some embodiments, the coating has a thickness of 50 µm or more. In some embodiments, the coating has a thickness of 75 µm or more.

The primary purpose of this summary has been to present certain of the inventor's concepts in a simplified form to facilitate understanding of the more detailed description that follows. This summary is not a comprehensive description of every one of the inventor's concepts or every combination of the inventor's concepts that can be considered "invention". Other concepts of the inventor's will be conveyed to one of ordinary skill in the art by the following detailed description together with the drawings. The specifics disclosed herein may be generalized, narrowed, and combined in various ways with the ultimate statement of what the inventor claims as his invention being reserved for the claims that follow.

DETAILED DESCRIPTION

Figure 1:
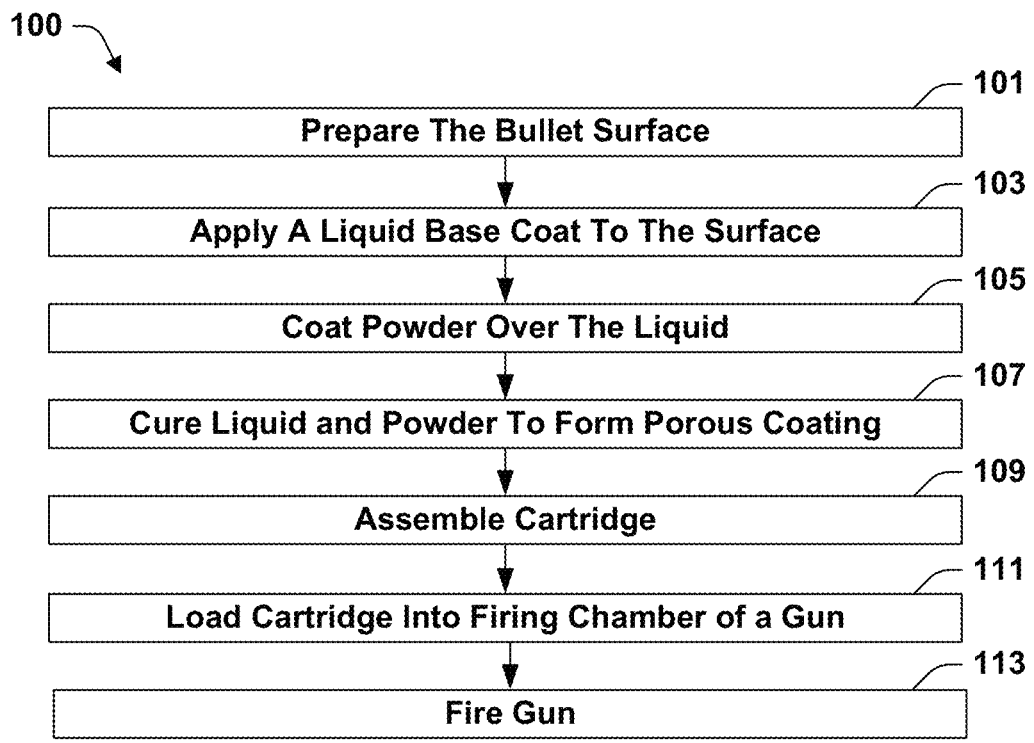
FIG. 1 is a flow chart of a process for coating a gun part in accordance with some aspects of the present teachings.

FIG. 1 is a flow chart of an example process 100 for forming a cartridge with a bullet having a coating according to the present disclosure and firing the bullet from a gun. Act 101 is preparing the bullet to receive the coating. The bullet can be of any material that can withstand the cure temperature of the coating. In some embodiments, the bullet is metal. In some embodiments, the bullet has a metal surface. The metal surface that receives the coating may be different from the core of the bullet. Examples of metal surface that may be coated include, without limitation, lead, copper, zinc, steel, and alloys of these and other metals. The metal surface may already have a coating, porous or non-porous, of any suitable material.

Preparing the metal surface is optional, although generally advisable. Any surface preparation process or combination of processes may be employed. Examples of surface preparation processes that may be used include physical and chemical processes. Examples of physical preparation processes include, without limitation, vibro-finishing, sanding, abrasive grit blasting, media blasting, plasma treatment, irradiative treatment, and the like. Examples of chemical preparation processes include, without limitation, washing, activating, sealing, and the like. The surface preparation process may form a coating on the surface by chemical, electrochemical, or other means. In some embodiments, surface preparation produces a conversion coating. Examples of conversion coatings include phosphate coatings, chromate coatings, black oxide, and the like. Surface preparation may include electroless plating or electroplating to form alloys of nickel, chrome, tin, or other metals. Surface preparation may include galvanizing.

Act 103 is applying a base coat to the metal surface. The base coat is a liquid composition that includes a thermosetting resin. The thermosetting resin may be part of a resin system that includes one or more of a curing agent, a hardener, an inhibitor, and plasticizer. Any suitable thermosetting resin may be used. Examples of thermosetting resins that may be used include acrylic, allyl, allyl, benzoxazine, epoxy, melamine formaldehyde, phenolic, polyamide, polyaryl sulphone, polyamide-imide, polybutadiene, polycarbonate, polydicyclopentadiene, polyester, polyphenylene sulphide, polyurethane, silicone, and vinyl ester resins and mixtures thereof. The thermosetting resin may make up 35% or more of the liquid by volume.

Optionally, the base coat includes a solvent. The solvent is present in at least an amount sufficient to make the composition liquid if a solvent is needed for that purpose. Low boiling point solvents are preferred as are organic solvents. Examples of solvents that may be suitable for the liquid primer include methyl ethyl ketone (MEK), N-Methyl-2-pyrrolidone (NMP), turpentine, xylene, mineral spirits, turpenoid, toluene, dimethylfomamide, glycol ethers, ethylbenzene, n-butyl acetate, alcohols, acetone and combination thereof. In some embodiments, the base coat includes one or more epoxy resins that remain liquid without solvent.

The base coat may include other components such as diluents, surfactants, modifiers, and other components that either contribute to the formation of the base layer or the functionality of the final coating. Examples of other components that may contribute to the formation of the base layer include, without limitation, curing agents, hardeners, inhibitors, and plasticizers. Examples of other components that may contribute the functionality of the coating include, without limitation, pigments and minerals of various types such as graphite, hexagonal boron nitride, talc, other clays, minerals between 1 and 10 on the scale of MOH's hardness, diamond, cubic boron nitride, metal flake, and the like.

The base coat may be formed by any suitable process. Depending on the composition of the base coat and the material of the metal surface, suitable processes may include spraying, electrostatic deposition, silk screening, dipping, ink jet printing, brushing, dip spinning, pad printing, film transferring, wiping, and the like. In some embodiments, the process includes some type of spraying. Spraying may be electrostatic spraying. Also, the bullet may be spun during or after spray deposition. The base coat may be formed with multiple layers and the layers may be of different materials.

An additional process may take place after the initial application of the base coat to improve uniformity or coverage. The additional process may include wiping, rinsing, or flinging excess base coat material from the surface. In some embodiments, centripetal force is used to fling excess base coat material from the surface. Centripetal force can be effective in producing a highly uniform base coat.

Act 105 is depositing the powder over the liquid base coat. The powder includes a thermosetting resin and a filler. The thermosetting resin of the powder may be part of a resin system that includes one or more of a curing agent, a hardener, an inhibitor, and a plasticizer. Any suitable thermosetting resin may be used. A thermosetting resin is any polymer resin that can be irreversibly hardened by curing regardless of whether curing is induced by heat, radiation, pressure, catalysis, or any other mechanism. In some embodiments, the thermosetting resin is of a type that can be granulated into a powder. Examples of thermosetting resins that may be used include, without limitation, acrylic, allyl, allyl, benzoxazine, epoxy, melamine formaldehyde, phenolic, polyamide, polyaryl sulphone, polyamide-imide, polybutadiene, polycarbonate, polydicyclopentadiene, polyester, polyphenylene sulphide, polyurethane, silicone, and vinyl ester resins and mixtures thereof. In some embodiments, the powder has the resin in an amount that is 35 percent or more by volume.

The filler material preferably has a melting point above a cure temperature of the thermosetting resin. In some of these teachings, the filler material is a solid lubricant. Examples of solid lubricants that may be used as the filler material include graphite, PTFE, polyamide, polyamide imide, polyimide, boron nitride, carbon monofluoride, molybdenum disulphide, talc, mica, kaolin, the sulfides, selenides, and tellurides of molybdenum, tungsten, or titanium and combinations thereof. The mixture preferably has the filler material in an amount that is 15 to 40 percent by volume. In some of these teachings the filler is at least 60 percent graphite. In some of these teachings the graphite particles have lengths in the range from 7 to 30 micrometers. Some application benefit from the inclusion of clay in the filler. In some of these teachings, the filler is from 20% to 40% clay by volume. Examples of clays that are suitable for the filler include kaolin, mullite, montmorillonite, and bentonite.

Figure 2:
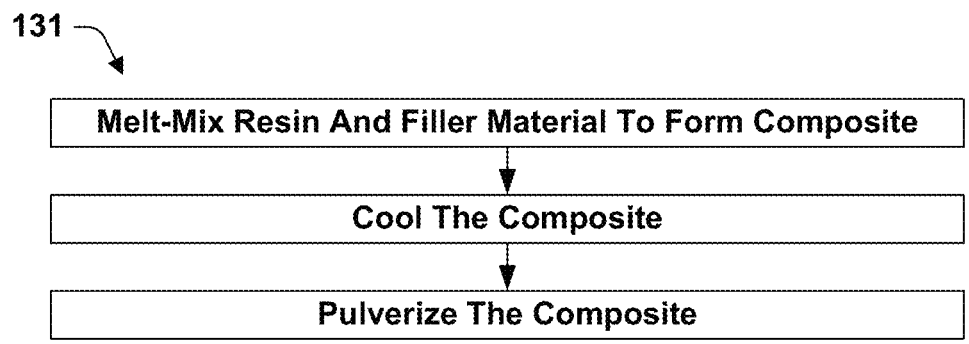
FIG. 2 is flow chart of a process that may be used in accordance with some aspects of the present teachings to form a powder.

The powder may be the product of a process 131, which is illustrated by FIG. 2. The process 131 includes act 133, melt-mixing the polymer resin and the filler to form a composite, act 135, cooling the composite, and act 137, breaking up the composite to form a powder. The composite may be broken up to form the powder by any suitable process such as milling or the like. The resulting powder preferably has a mean particle size in the range from 2 to 200 µm. For purposes of the present disclosure, particle sizes are the diameters of spheres having the same volume as the particles. More preferably, the mean particle size is in the range from 5 to 150 µm. Still more preferably the particle size is in the range from 10 to 80 µm. Smaller particles may be difficult to process. Larger particles may not adhere well when electrostatics are used. Preferably, the filler and the resin are both present in the individual particles of the powder.

The powder may be deposited over the liquid by any suitable process. In some embodiments, the coating process comprises electrostatics, e.g., electrostatic spray deposition. More generally, the coating process may include one or more of spraying the powder, fluidizing the powder, heating the powder, and heating the surface to be coated. If the surface is heated, it is not heated in a way that solidifies the base layer. It may also be feasible to apply the powder by dipping, rolling, screen printing, or other film transfer process. The powder may be formed into a slurry to facilitate use in one of the foregoing processes.

In some embodiments, act 105 includes depositing multiple layers. Each layer may comprise a different type of powder. The powders may vary in composition, size distribution, or any other characteristic. The different layers may be used in combination to provide desirable wear characteristics and the like. For example, differing powder composition may be used to provide a low wear resistance upper layer and a second that produces a higher resistance layer underneath. A variety of parameters may be adjusted to produce desired friction, durability, and rheological properties. Useful parameters to adjust include the identity of the thermosetting resin, the cure temperature, the amount of filler, the composition of the filler including the amount of clay the filler contains, and the porosity of the coating, which may be controlled through the size distribution of the dry powder particles.

Act 107 is curing the base layer and the powder to form the coating. Curing evaporates any solvent from the base layer and hardens the base layer. Curing may be driven by any of heat, radiation, pressure, catalysis, combinations thereof, or any other mechanism. Where curing is driven by heat, heating may take place by convection, conduction, induction, radiative heating, combinations thereof, or any other mechanism. In some embodiments, curing causes the powder to sinter, but curing completes without the particles flowing sufficiently to lose their discrete identities. In some embodiments, curing takes place in a temperature range between 100° C. and 300° C. In some embodiments, curing takes place in a temperature range between 150° C. and 200° C. Curing solidifies the coating. Curing may also consolidate or densify the coating. The various layers of the coating may be cured simultaneously or sequentially.

Figure 3:
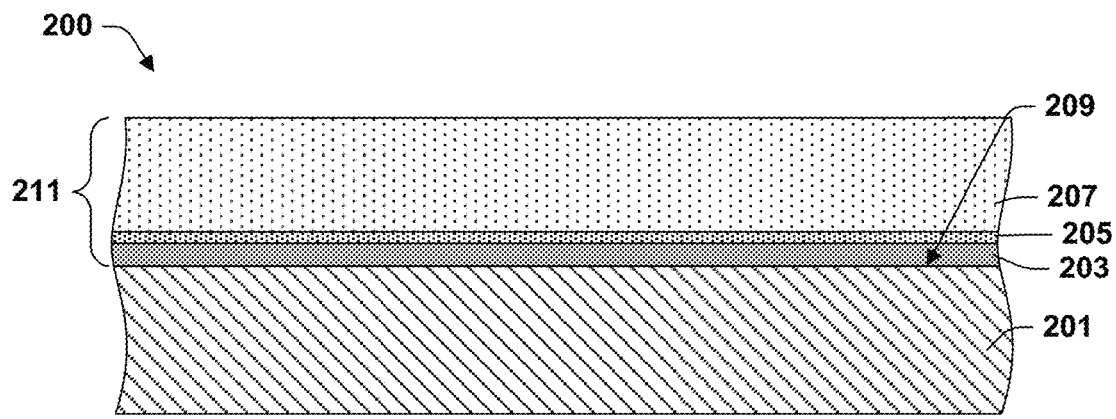
FIG. 3 is a sketch of a part surface with a coating in accordance with some aspects of the present teachings.

FIG. 3 illustrates a portion of the surface of a bullet 200 that may be a product of the initial stages of the process 100. The bullet 200 includes metal part 201 adjacent the surface 209 of the bullet 200 and a coating 211 formed on a surface 209. The coating 211 includes a base layer 203 formed from a liquid coat, an upper layer 207 formed from powder particles, and an interfacial area 205 formed from both the liquid coat and the powder particles.

The base layer 203 is generally non-percolating in the sense that neither liquid nor air can pass through it. In some embodiments, the base layer has 5% or less porosity. In some embodiments, the base layer has 2% or less porosity. In some embodiments, the base layer has no porosity. The base layer 203 includes a thermoset polymer matrix and may include one or more non-polymer materials dispersed within the thermoset polymer matrix. The base layer 203 adheres the coating 211 to the surface 209 and may serve other functions such as providing corrosion resistance, sealing, and the like for the surface 209.

In some embodiments, the upper layer 207 has an interconnectivity above a percolation threshold meaning that fluids can pass through it. The porosity of the upper layer 207 may be in the range from 2 to 80 percent. In some embodiments, the porosity of the upper layer 207 is in the range from 2 to 40 percent. In some embodiments, the porosity of the upper layer 207 is in the range from 2 to 20 percent. The porosity may facilitate the provision of controlled wear properties, desirable rheological properties, and provide a reservoir of lubricating fluid. The provision of porosity in the upper layer 207 is facilitated by curing without allowing excessive flow, whereby in some embodiments individual particles of the powder from which the upper layer 207 was formed remain identifiable within the upper layer 207. The upper layer 207 may provide the coating 211 with targeted characteristics such as, for example, friability, lubricity, controlled wear, heat transport, and the like. In some embodiments, the upper layer 207 is two or more times thicker than the base layer 203.

The thickness of the coating 211 may vary over the bullet 200. The coating 211 may be very thick on the bullet 200. In some embodiments, the thickness of the coating 211 is in the range from about 25 µm to about 1000 µm. The thickness may be varied widely and adjusted according to the size of the caliber of the bullet 200 the type of gun the bullet 200 is to be fired from.

In some embodiments, the upper layer 207 includes multiple strata (sublayers) composed of different types of particles. The different strata may be used to control characteristics of the coating. For example, the upper layer 207 may include an upper stratum that wears relatively quickly and a lower stratum that is comparatively wear resistant to provide a balance between easy adaptation to the barrel shape, maintenance of the barrel plug, and stability under the torque applied of the bullet 200 by the rifling.

The interfacial area 205 includes particles of the upper layer 207 partially surrounded or entirely surrounded, partially sunken or entirely sunken, into the polymer matrix of the base layer 203. Fluid-solid interactions may cause the formation of a complex interface. The interfacial area provides adhesion between the upper layer 207 and the base layer 203.

Figure 4:
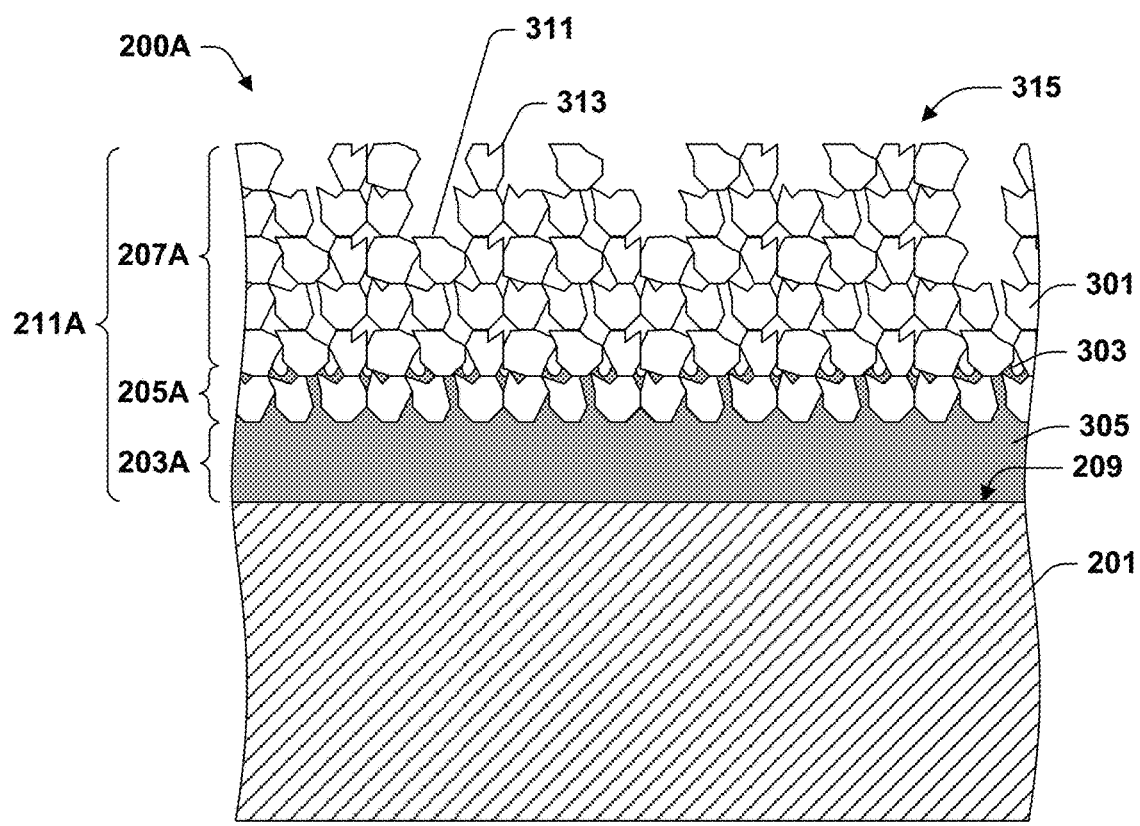
FIG. 4 is another sketch of a part surface with a coating in accordance with some aspects of the present teachings.

FIG. 4 is a sketch of a surface portion of a bullet 200A, which is an example of the bullet 200 and illustrates a possible structure. The bullet 200A includes the metal part 201 and a coating 211A formed on the surface 209 of the metal part 201. The coating 211A includes a non-porous base layer 203A formed from a liquid coat, a porous upper layer 207A formed from powder particles, and an interfacial area 205A formed from both the liquid coat and the powder particles.

The upper layer 207A includes particles 301 that have been sintered enough to flow and bind together to form a solid mass without entirely losing their discrete identities. In other words, the particles 301 may have flowed somewhat, but the flow has been limited so that the abradable coating 211A has structures corresponding to individual particles 301. In particular, an upper surface 315 of the mass may include peaks 313 and valleys 311. The peaks 313 are asperities or smooth bumps depending on the shapes of the particles 301 and the extent to which they have flowed.

The base layer 203A includes a polymer matrix 305. The interfacial area 205A includes particles 301 that are bound by the polymer matrix 305. Some particles 301 may be completely immersed in the polymer matrix 305. Other particles 301 may be partially surrounded by the polymer matrix 305. The particles 301 and the polymer matrix 305 may have a complex interface due to interactions of the liquid base layer and particles of the powder. In some embodiments, those interaction result in a contact structure 303 that is partially determined by a contact angle between the liquid base coat and particles of the powder. FIG. 4 illustrates a structure that may form when the base coat is wetting with respect to the powder particles.

Before break-in, the upper surface 315 has a roughness that is related to a structure of the particles 301. In particular, because the abradable coating 211 cures without the particles 301 flowing sufficiently to entirely loose their discrete identities, the upper surface 315 has peaks 313 that individually correspond to one or more of the particles 301. In some embodiments, before break-in, the upper surface 315 has a roughness Ra in the range from about 0.5 μm to about 20 μm. In some embodiments, before break-in, the upper surface 315 has a roughness Ra in the range from about 1 μm to about 10 μm. In some embodiments, before break-in, the upper surface 315 has a roughness Ra greater than about 2 μm.

After break-in, the upper surface 315 may be smoother. Nevertheless, in some embodiment the upper surface 315 continues to have roughness that relates to the particles 301 retaining a degree of separation. Asperities on the upper surface 315 may be reduced by wear and the surface 315 may recede, but in some embodiments valleys 311 between particles 301 continue to appear of the upper surface 315. In some embodiments, after break-in, the upper surface 315 has a roughness Ra in the range from about 0.2 μm to about 10 μm. In some embodiments, after break-in, the upper surface 315 has a roughness Ra in the range from about 0.5 μm to about 5 μm. In some embodiments, after break-in, the upper surface 315 has a roughness Ra greater than about 1 μm.

The removal of asperities from the upper surface 315 and the appearance of new values 311 as wear continues may result in the valleys 311 having a greater contribution to surface roughness than the peaks 313. This effect is captured by the Rsk of the surface, the Rsk being a roughness parameter that measures the skewness of the of a surface height distribution about a mean. In some embodiments, prior to break-in, the Rsk of the upper surface 315 is in the range from −0.5 to 0.5. In some embodiments, prior to break-in, the Rsk of the upper surface 315 is in the range from −0.25 to 0.25. After break-in these Rsk values are reduced. In some embodiments, after break-in reduces the Rsk be about −0.5 or more. In some embodiments, after break-in, the Rsk is less than about −0.25. In some embodiments, after break-in, the Rsk is less than about −0.50. In some embodiments, after break-in, the Rsk is less than about −1.0.

A structure of the upper surface 315 may also be characterized in terms of the roughness parameters Reduced Peak Height (Rpk) and Reduced Valley Depth (Rvk). Rpk relates to peak height over a surface mean height. Rvk relates to valley depth below the surface mean height. In some embodiments, prior to break in, both Rpk and Rvk are at least about 2 μm. In some embodiments, prior to break in, both Rpk and Rvk are at least about 3 μm. Rvk may remain nearly the same or even increase after break-in. Rpk, on the other hand, may be reduced. In some embodiments, after break-in, the Rpk is less than about 3 μm. In some embodiments, after break-in, the Rpk is less than about 2 μm. In some embodiments, after break-in, the Rpk is half or less than half Rvk. In some embodiments, after break-in, the Rpk is one fourth or less than one fourth Rvk.

Figure 5:
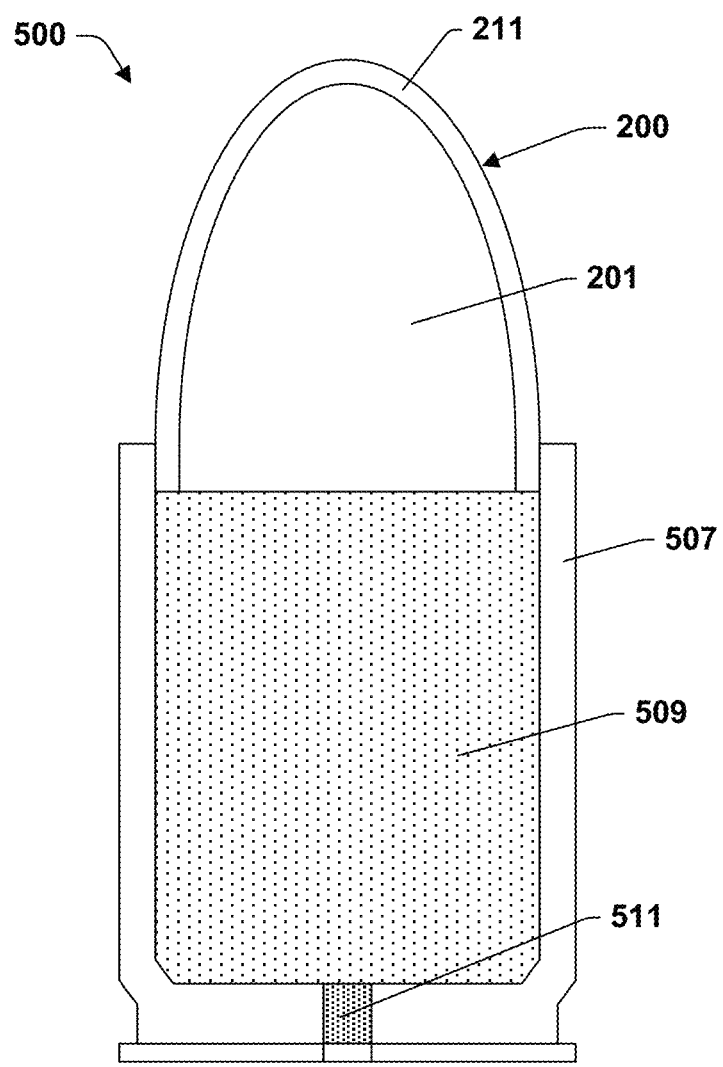
FIG. 5 illustrates a cartridge in accordance with the present teachings.

Returning to FIG. 1, the process 100 may continue with act 109, assembling a cartridge with the bullet 200. FIG. 5 shows an example cartridge 500 with the bullet 200. The cartridge 500 is a center fire cartridge but could be a rim fire cartridge or any other type of cartridge. The cartridge includes a casing 507 that contains powder 509 and holds the bullet 200. As shown in FIG. 5, the coating 211 may extend inside the casing 507. The primer 511 may be located at the base of the casing 507.

Figure 6:
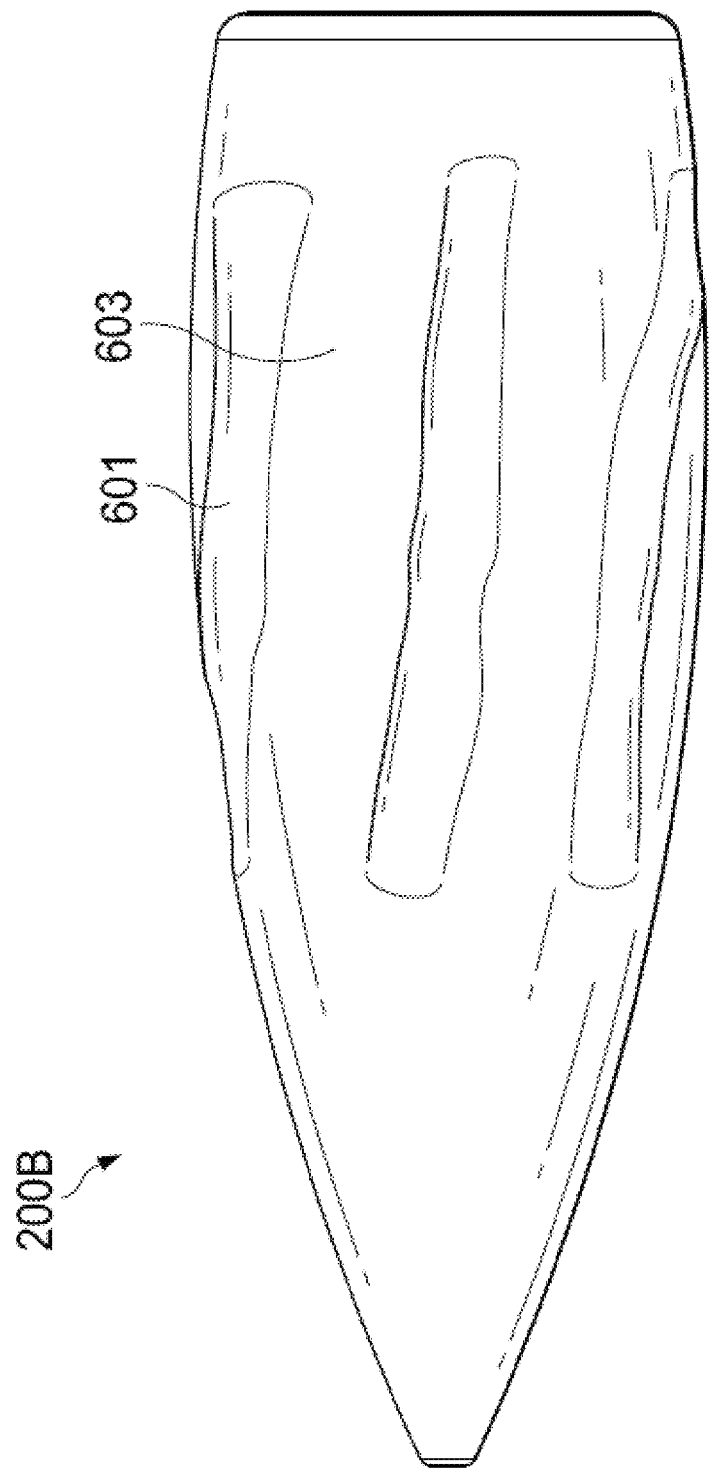
FIG. 6 illustrates a bullet subject to a coating, packaging, and firing process in accordance with the present teachings.

Returning again to FIG. 1, act 111 is loading the cartridge 500 in a chamber (not shown) of a gun (not shown). Act 113 is firing the gun. FIG. 6 illustrates a bullet 200B that has been subject to the coating, packaging, and firing of the process 100. The gun was a Stag Arms AR15 with a Daniel Defense 16" M4 profile, 1/7 twist, chrome-lined, and having mid-length gas system. The bore diameter was 0.220 inches and the groove diameter was 0.224 inches. The cartridge had a brass casing, an ArmsCor SS109 bullet, 24.6 gr of WC844 Powder, and CCI primer. The bullet was pushed through a die to narrow the O.D. to 0.221 inches then coated back up to a diameter in the range from 0.224 to 0.2245 inches.

The bullet 200B has furrows 601 corresponding to the lands of the rifling. The coating 211 is completely removed in the furrows 601. The coating is thinned on the ridges 603 between the furrows 601, but remains intact providing uniform coverage in those areas.

Figure 7:
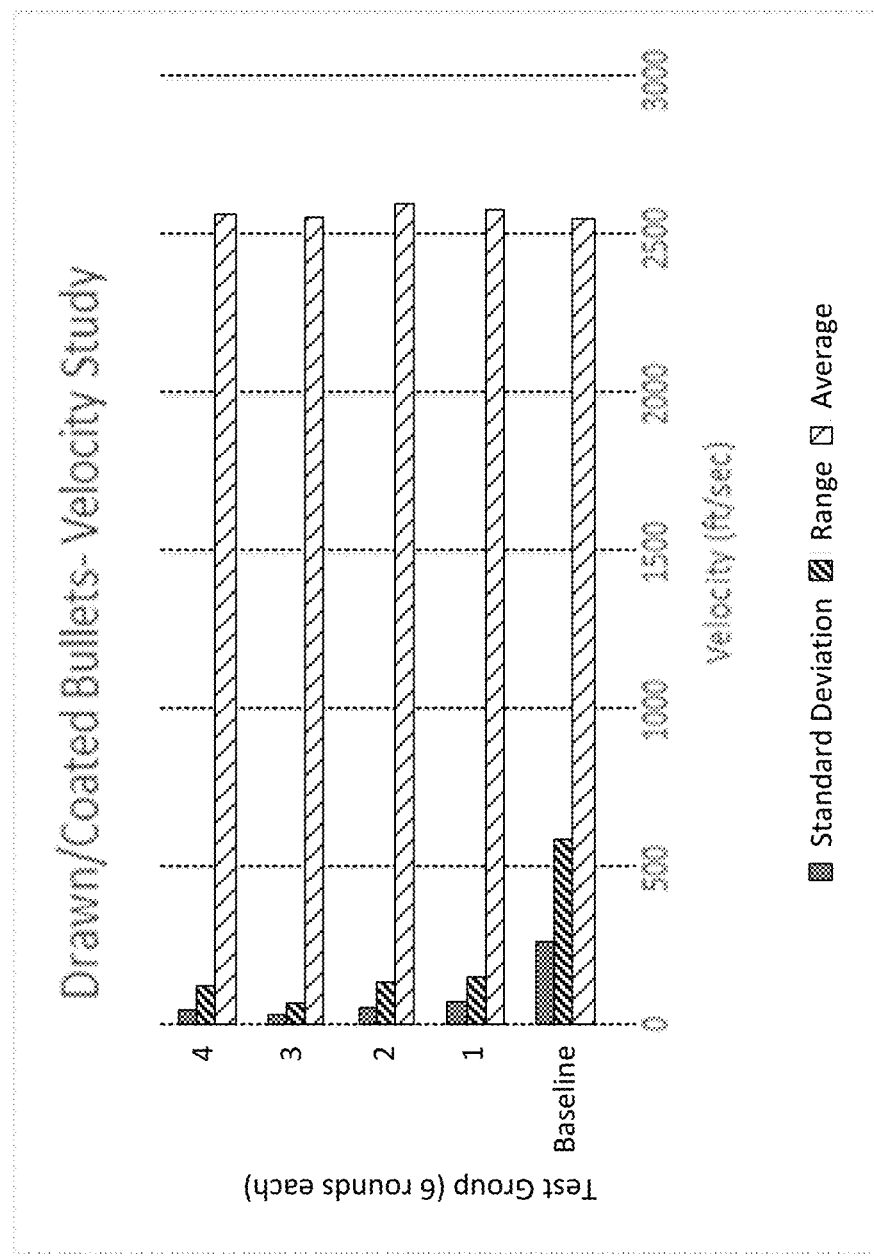
FIG. 7 is a plot showing an effect of a coating according to the present teachings the velocity distribution of bullets from a gun.

FIG. 7 provides a bar chart showing the velocity distributions from a series of four trials in which six bullets 200B were fired from the AR15. The baseline was for the stock ammunition. The chart shows that bullet velocity was greater and the velocity distribution was much more narrow when the coated bullets were used.

The bullet 200 and the cartridge 500 may can be for any type of gun. Examples of guns that may be use bullets 200 according to the present teachings include, without limitation, semi-automatic handguns, e.g., a Colt 1911 style pistol, a semi-automatic rifle, e.g., an AR-15, a machine gun such as an M249 light machine gun, an M60 machine gun, or a Browning .50 caliber heavy machine gun, a Gatling-style rotary cannon, e.g., an M61 Vulcan or even a heavier gun.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A loaded gun, comprising:
a gun loaded with a bullet;
wherein the bullet has a metal core and a coating on the metal core;
the coating comprising a thermoset polymer and a filler;
the gun has a barrel with rifling that includes grooves and lands;
the barrel has a bore diameter and a groove diameter; and
the metal core has a diameter less than the groove diameter.

2. The loaded gun of claim 1, wherein the bullet has a diameter greater than the groove diameter.

3. The loaded gun of claim 1, wherein the metal core has a diameter that is greater than the bore diameter and at most equal to the sum of the bore diameter and half the difference between the groove diameter and the bore diameter.

4. The loaded gun of claim 1, wherein the coating comprises a porous upper layer which includes the thermoset polymer and the filler.

5. The loaded gun of claim 4, wherein the porous upper layer has an interconnectivity above a percolation threshold.

6. The loaded gun of claim 4, wherein the coating further comprises a lower layer comprising a second thermoset polymer, wherein the second thermoset polymer has a distinct composition from the thermoset polymer of the porous upper layer.

7. The loaded gun of claim 6, wherein the lower layer has a lower porosity than the porous upper layer.

8. The loaded gun of claim 4, further comprising a fluid lubricant within the porous upper layer.

9. The loaded gun of claim 1, wherein the filler is a dry film lubricant, and the filler is from 15% to 40% by volume of solid material in the coating.

10. The loaded gun of claim 1, wherein the metal core comprises lead.

11. The loaded gun of claim 1, wherein the coating comprises particles individually comprising the thermoset polymer and a filler, wherein the particles are bound together to form a solid mass having discernable boundaries between individual particles.

12. The loaded gun of claim 11, wherein the coating comprises multiple strata characterized by distinct particle compositions or sizes.

13. A bullet, comprising:
a metal core;
a coating over the metal core;
wherein the coating comprises particles that individually comprise a first thermoset polymer and a filler;
the particles comprise the filler in an amount that is from 15% to 40% by volume; and
the particles are bound together to form a solid mass having discernable boundaries between individual particles.

14. The bullet of claim 13, wherein the coating further comprises a base layer between the solid mass and the metal core, and the base layer comprises a second thermoset polymer and has a lower porosity than the solid mass.

15. The bullet of claim 13, wherein the metal core is lead.

16. The bullet of claim 13, wherein the solid mass is porous.

17. The bullet of claim 13, wherein the solid mass has pores providing a porosity above a percolation threshold.

18. The bullet of claim 13, wherein the solid mass has pores providing the solid mass with a porosity above a percolation threshold.

19. The bullet of claim 13, wherein the solid mass is a product of a process comprising:
forming a powder of the particles over the bullet, wherein the particles comprise a thermoset resin and the filler; and
curing the thermosetting resin to form the first thermoset polymer, wherein curing causes the particles to sinter, but curing completes without the particles flowing sufficiently to entirely lose their discrete identities.

20. The bullet of claim 19, wherein the particles are a product of a process comprising:
melt-mixing the thermosetting resin and the filler to form a composite;
cooling the composite; and
breaking up the composite to form the particles.

* * * * *